(12) United States Patent
Amoudi et al.

(10) Patent No.: US 11,898,441 B2
(45) Date of Patent: Feb. 13, 2024

(54) METHOD AND SYSTEM FOR OPTIMIZING RIG ENERGY EFFICIENCY USING MACHINE LEARNING

(71) Applicant: SAUDI ARABIAN OIL COMPANY, Dhahran (SA)

(72) Inventors: Ahmad Amoudi, Al Madinah (SA); Faisal Osama Abdulfattah, Dhahran (SA); Badr Al-Hogbi, Abqaiq (SA); Meshari Alquraini, Dhahran (SA); Abdulelah Al-Edrissi, Jeddah (SA); Abdullah Alghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 143 days.

(21) Appl. No.: 17/393,943

(22) Filed: Aug. 4, 2021

(65) Prior Publication Data

US 2023/0037305 A1    Feb. 9, 2023

(51) Int. Cl.
*E21B 7/02* (2006.01)
*G06Q 10/04* (2023.01)
(Continued)

(52) U.S. Cl.
CPC .............. *E21B 49/003* (2013.01); *E21B 7/02* (2013.01); *G06Q 10/04* (2013.01); *G06Q 10/06* (2013.01); *E21B 2200/20* (2020.05)

(58) Field of Classification Search
CPC ...... E21B 49/003; E21B 7/02; E21B 2200/20; G06Q 10/04; G06Q 10/06
See application file for complete search history.

(56) References Cited

U.S. PATENT DOCUMENTS 10,415,348 B2    9/2019   Zhang et al.
10,754,334 B2    8/2020   Cella et al.
(Continued)

FOREIGN PATENT DOCUMENTS

CN   108107733 A      6/2018
CN   108756848 A  *  11/2018   ............. E21B 44/00
(Continued)

OTHER PUBLICATIONS

Manusov et al.; "Estimation of Energy Consumption of DM-H Drill Rig Main Drive in Far North Conditions"; 2018 International Multi-Conference on Industrial Engineering and Modern Technologies (FarEastCon); Oct. 2018 (5 pages).
(Continued)

*Primary Examiner* — Catherine T. Rastovski
*Assistant Examiner* — Yossef Korang-Beheshti
(74) *Attorney, Agent, or Firm* — Osha Bergman Watanabe & Burton LLP (57) ABSTRACT

A method may include obtaining power production and fuel consumption data of a first piece of rig equipment through a flow meter, where the rig equipment includes a plurality of pieces of equipment. The method further includes feeding the power production and fuel consumption data of the first piece of rig equipment into a real-time monitoring system of the rig via the flow meter. The method further includes determining an energy efficiency, based on real-time performance, of the first piece of rig equipment using a consumption efficiency model. The method further includes comparing the energy efficiency of the first piece of rig equipment against continuously updated historical data of the first piece of rig equipment by a real-time database monitoring system. The method further includes identifying deficiencies of the
(Continued)

first piece of rig equipment in real-time and determining maintenance or replacement of the first piece of rig equipment.

16 Claims, 5 Drawing Sheets

(51) Int. Cl.
  *G06Q 10/06* (2023.01)
  *E21B 49/00* (2006.01)

(56) References Cited

U.S. PATENT DOCUMENTS

| | | |
|---|---|---|
| 2013/0127900 A1 | 5/2013 | Pena et al. |
| 2017/0204712 A1 | 7/2017 | Zhang et al. |
| 2020/0089215 A1 | 3/2020 | Cella et al. |

FOREIGN PATENT DOCUMENTS

| | | | | |
|---|---|---|---|---|
| CN | 108756848 A | | 11/2018 | |
| CN | 111810296 A | * | 10/2020 | ............. E21B 43/34 |
| CN | 112749473 A | * | 5/2021 | |
| WO | WO-2020244684 A1 | * | 12/2020 | |

OTHER PUBLICATIONS

"Digital Drilling Rig"; Aug. 2, 2021; pp. 1-3; Retrieved from the Internet: URL: https://jv-technoton.com/solutions/digital-drilling/ (3 pages).

* cited by examiner

METHOD AND SYSTEM FOR OPTIMIZING RIG ENERGY EFFICIENCY USING MACHINE LEARNING

BACKGROUND

Diesel consumption forms a major contribution to drilling operation costs. Normally, commercially available alternatives are limited to optimize the drilling process through monitoring various drilling parameters. However, there is a need to monitor an energy efficiency performance of rig equipment in real-time during drilling to immediately identify and react when a rig is not performing within the expected limits. In addition, the real-time monitoring may be used to optimize the drilling process by optimizing an energy consumption of the rig equipment as well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method which includes obtaining power production and fuel consumption data of a first piece of rig equipment through a flow meter, where the rig equipment includes a plurality of pieces of equipment. The method further includes feeding the power production and fuel consumption data of the first piece of rig equipment into a real-time monitoring system of the rig via the flow meter. The method further includes determining an energy efficiency, based on real-time performance, of the first piece of rig equipment using a consumption efficiency model. The method further includes comparing the energy efficiency of the first piece of rig equipment against continuously updated historical data of the first piece of rig equipment by a real-time database monitoring system. The method further includes identifying deficiencies of the first piece of rig equipment in real-time and determining maintenance or replacement of the first piece of rig equipment. based on the comparison.

In another aspect, embodiments disclosed herein generally relate to a drilling rig. The drilling rig includes a rig engine that includes a generator configured to provide power to a plurality of rig equipment of the drilling rig, the generator comprising a monitoring system for monitoring real-time operation of a first piece of rig equipment of the plurality of rig equipment of the drilling rig. The drilling rig further includes a flow meter operatively connected to the generator through which power production and fuel consumption data are fed to a real-time database monitoring system. The drilling rig further includes a computing device operatively connected to the real-time data base monitoring system and includes a consumption efficiency model. The computing device includes a processor configured to execute a method for determining an energy efficiency of the first piece of rig equipment. The computing device feeds the power production and fuel consumption data of the first piece of rig equipment from the flow meter into the real-time monitoring system of the rig via the flow meter. The computing device determines an energy efficiency, based on real-time performance, of the first piece of rig equipment using the consumption efficiency model. The computing device compares the energy efficiency of the first piece of rig equipment against continuously updated historical data of the first piece of rig equipment by a real-time database monitoring system. The computing device identifies deficiencies of the first piece of rig equipment in real-time and determining maintenance or replacement of the first piece of rig equipment based on the comparison.

In another aspect, embodiments disclosed herein generally relate to a non-transitory computer readable medium storing instruction. The instructions are executable by a computer processor and include functionality for obtaining power production and fuel consumption data of a first piece of rig equipment through a flow meter, where the rig equipment includes a plurality of pieces of equipment. The instruction further includes feeding the power production and fuel consumption data of the first piece of rig equipment into a real-time monitoring system of the rig via the flow meter. The instruction further includes determining an energy efficiency, based on real-time performance, of the first piece of rig equipment using a consumption efficiency model. The instruction further includes comparing the energy efficiency of the first piece of rig equipment against continuously updated historical data of the first piece of rig equipment by a real-time database monitoring system. The instruction further includes identifying deficiencies of the first piece of rig equipment in real-time and determining maintenance or replacement of the first piece of rig equipment. based on the comparison.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments disclosed herein are directed to a real-time monitoring method of operating parameters and deficiencies of rig equipment during a drilling process. In particular, embodiments disclosed herein may implement the method for real-time monitoring of the rig equipment's energy efficiency performance by installing a real-time monitoring system, which may be called a power-logger, to a rig engine and monitoring power production and fuel consumption through a digital flow-meter, making it possible to immediately identify and react when the rig equipment is not performing within the expected limits. In addition, the method may incorporate optimizing the energy consumption of the rig equipment along with the optimization of the drilling process by utilizing a real-time database monitoring system to monitor operating parameters of the rig equipment. Both data sets are linked to establish optimum energy efficiency values to form the basis of continuously updated historical data and are compared later to the real-time optimum energy efficiency values of the rig equipment for any deviations.

Embodiments of the invention may be used in all onshore and offshore rigs to optimize energy consumption during drilling operations by monitoring various drilling parameters in real time. In addition, the data obtained through real-time monitoring may be fed into a real-time database monitoring system to enable the system to identify deficient equipment by comparing real-time performance of an energy efficiency of the system to historical data or original equipment manufacturer (OEM) provided information, such as a data sheet.

Figure 1A:
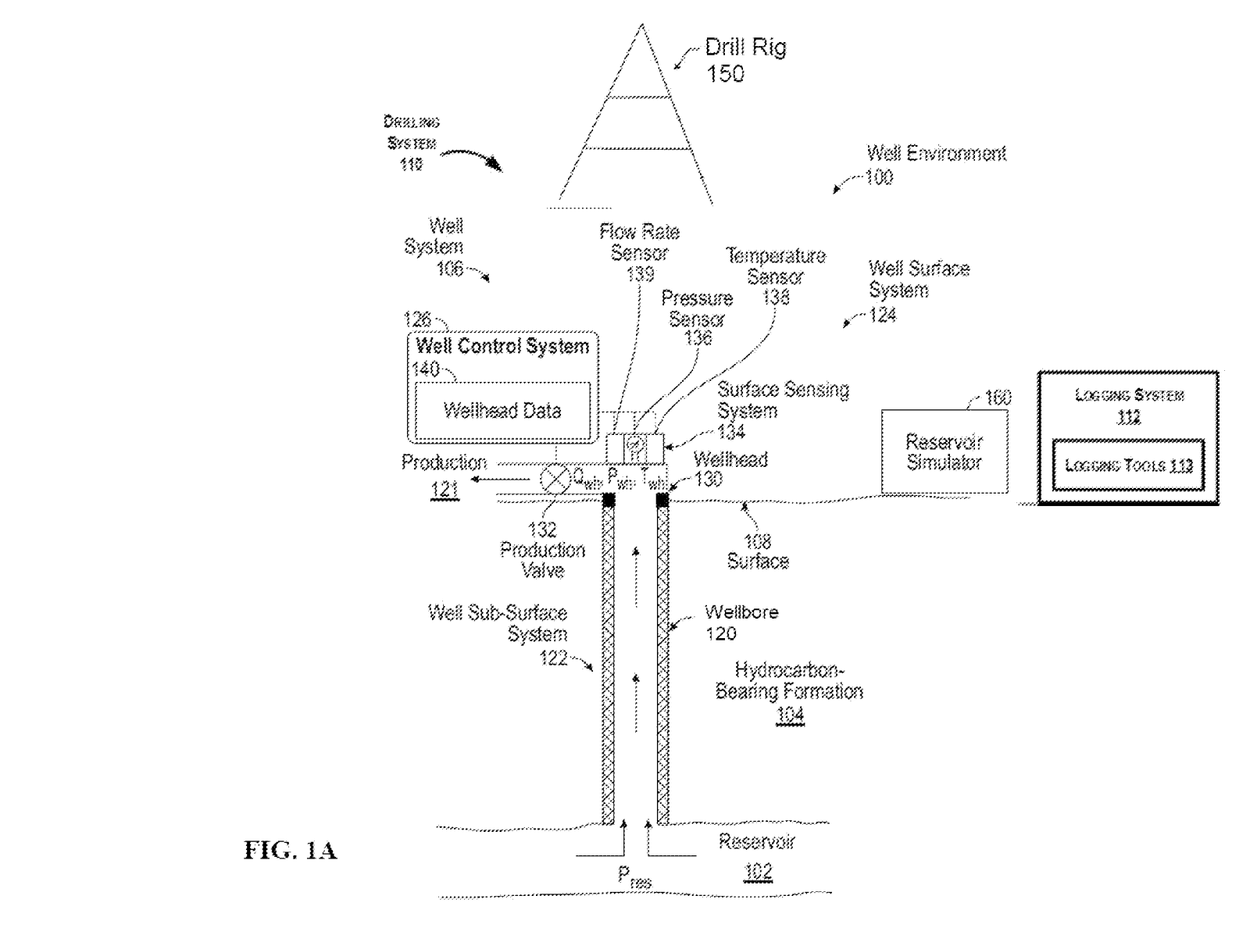
FIG. 1A shows a system in accordance with one or more embodiments.

FIG. 1A shows a schematic diagram in accordance with one or more embodiments. More specifically, FIG. 1A illustrates a well environment (100) in which a monitoring system to monitor operating parameters of rig equipment may be implemented, includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

The well environment (100) may include a drilling system (110) and a logging system (112). The drilling system (110) may include a drill string, drill bit or a mud circulation system for use in boring the wellbore (120) into the hydrocarbon-bearing formation (104).

The logging system (112) may include one or more logging tools (113), such as a nuclear magnetic resonance (NMR) logging tool or a resistivity logging tool, for use in generating wellhead data (140) of the formation (104). For example, a logging tool may be lowered into the wellbore (120) to acquire measurements as the tool traverses a depth interval (for example, targeted reservoir section) of the wellbore (120). The plot of the logging measurements versus depth may be referred to as a "log" or "well log". Well logs may provide depth measurements of the well system (106) that describe such reservoir characteristics as formation porosity, formation permeability, resistivity, water saturation, and the like. The resulting logging measurements may be stored or processed or both, for example, by the well control system (126), to generate corresponding well logs for the well system (106). A well log may include, for example, a plot of a logging response time versus true vertical depth (TVD) across the depth interval of the wellbore (120).

In some embodiments, the well system (106) includes a drill rig (150), a wellbore (120), a well sub-surface system (122), a well surface system (124), and a well control system ("control system") (126). The drill rig (150) is the machine used to drill a borehole to form the wellbore (120). Some of the major rig equipment of the drill rig (150) are shown in a detailed block diagram in FIG. 1B in accordance with one or more embodiments.

Figure 1B:
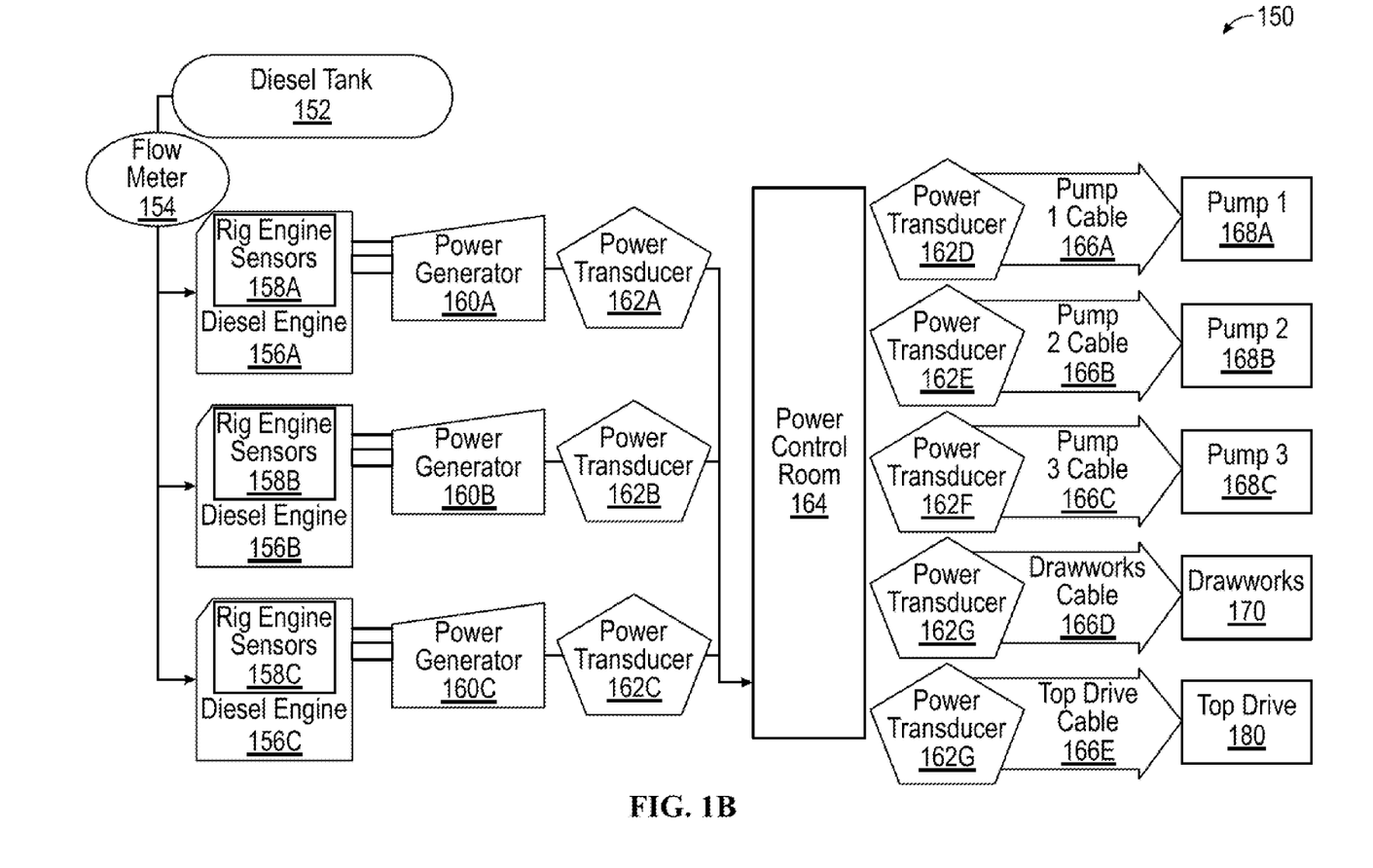
FIG. 1B shows a block diagram of a system in accordance with one or more embodiments.

In one or more embodiments, the drill rig (150) includes a diesel tank (152), a flow meter (154), a rig engine with a rig engine sensor, power generators (160A, 160B, and 160C), a power control room (164), drilling fluid pumps (e.g., rig mixing pumps (168A, 168B, and 168C)), a drawworks (170), and a rotary table or top drive (180). The drill rig (150) further includes a drilling fluid tanks to store drilling fluid, a drill string and an auxiliary equipment (not shown). The diesel tank (152) is a major corollary oilfield equipment in the drill rig (150) and is mainly used to store and provide fuel to power generator sets. In one or more embodiments, a diesel-powered generator is generally used as the power generators (160A, 160B, and 160C) for supplying power to the rig. Additional configurations and features get required for stationed offshore diesel-powered generator. The power generators (160A, 160B, and 160C) are manufactured with materials and coatings that can withstand the extreme temperature along with water, salt, and wind in marine conditions. The drilling fluid pumps (168A, 168B, and 168C) are important rig equipments used for oil well drilling and are generally reciprocating piston/plunger pumps designed to circulate drilling fluid under high pressure (up to 7,500 psi or 52,000 kPa) down the drill string and back up the annulus.

In one or more embodiments, the drawworks (170) is a primary hoisting machinery component of the rotary drill rig (150). The drawworks (170) often has a pulley drive arrangement on the front side to provide turning power to the rotary table or top drive (180), although on many rigs the rotary table or top drive (180) is independently powered. In addition, the drawworks (170) is used to hoist or lower several hundred thousand pounds of weight and comes in AC, DC or mechanical power units. Horsepower (HP) ratings for the drawworks (170) may also have a wide range, often ranging from 1000 HP to over 3000 HP. The rotary table (not shown) is a mechanical device on a drilling rig that provides clockwise (as viewed from above) rotational force to the drill string to facilitate the process of drilling a borehole. The top drive (180) is an electrical motor that has the ability to travel vertically up and down and to impart torque to a drill pipe of the drill rig (150).

There may be more than one rig engine and rig engine sensor associated with a single drill rig (150). For example, diesel engines (156A, 156B, and 156C) with rig engine sensors (158A, 158B, and 158C). The measurements taken by the flow meter (154) and the rig engine sensors (158A, 158B, and 158C) are converted to respective signals using power transducers (162A, 162B, and 162C) and are fed to the power control room (164) for further analysis. The rig engine sensors (158A, 158B, and 158C) are employed to measure pressure, temperature, load, and RPM of an exhaust fuel. In some embodiments, the power transducers (162A, 162B, and 162C) are employed at the boundaries of the power generators (160A, 160B, and 160C) to convert electrical signals into other physical quantities (e.g., energy, force, torque, light, motion, and position). The drill rig (150) uses torque converters, clutches, and transmissions powered by the diesel engines (156A, 156B, and 156C). For example, the drill rig (150) may further include power transducers (162D, 162E, 162F, 162G, and 162H) which are employed at the boundary of the power control room (164) to power the rig mixing pumps (pump 1 (168A), pump 2 (168B), and pump 3 (168C)) through pump cables (166A, 166B, and 166C), the drawworks (170) through a drawworks cable (166D), and the top drive (180) through a top drive cable (166E). The power control room (164) may include a computing device that is the same as or similar to that of computer system (400) described below in FIGS. 4A and 4B and the accompanying description.

In one or more embodiments, the rig engine of the drill rig (150) may include one or more flow meters (shown in FIG. 1B) configured to monitor fuel consumption of the rig equipment. In addition, in one or more embodiments, the flowmeter (154) may also be added to the diesel tank (152) of the drill rig (150) to monitor fuel consumption on the diesel tank feeding all rig engines, as shown in FIG. 1B. The flow meter (154) of the rig engine and of the diesel tank (152) may be a digital flow meter or a manual flow meter.

Turning to FIG. 1A, the wellbore (120) may include a bored hole that extends from the surface (108) into a target zone of the hydrocarbon-bearing formation (104), such as the reservoir (102). An upper end of the wellbore (120), terminating at or near the surface (108), may be 1Beferred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, the control system (126) may control various operations of the well system (106), such as well production operations, well completion operations, well maintenance operations, and reservoir monitoring, assessment, and development operations. The control system (126) may include hardware or software for managing drilling operations or maintenance operations. For example, the control system (126) may include one or more programmable logic controllers (PLCs) that include hardware or software with functionality to control one or more processes performed by the drilling system (110). Specifically, a programmable logic controller may control valve states, fluid levels, pipe pressures, warning alarms, or pressure releases throughout a drilling rig. In particular, a programmable logic controller may be a ruggedized computer system with functionality to withstand vibrations, extreme temperatures (for example, −575° C.), wet conditions, or dusty conditions, for example, around the drill rig (150). Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. In some embodiments, the control system (126) includes a computer system that is the same as or similar to that of computer system (400) described below in FIGS. 4A and 4B and the accompanying description.

In some embodiments, sensors may be included in the well control system (126) that includes a processor, memory, and an analog-to-digital converter for processing sensor measurements. For example, the sensors may include acoustic sensors, such as accelerometers, measurement microphones, contact microphones, and hydrophones. Likewise, the sensors may include other types of sensors, such as transmitters and receivers to measure resistivity or gamma ray detectors. The sensors may include hardware or software or both for generating different types of well logs (such as acoustic logs or sonic longs) that may provide data about a wellbore on the formation, including porosity of wellbore sections, gas saturation, bed boundaries in a geologic formation, fractures in the wellbore or completion cement. If such well data is acquired during drilling operations (that is, logging-while-drilling), then the information may be used to adjust drilling operations in real-time. Such adjustments may include rate of penetration (ROP), drilling direction, and altering mud weight.

In some embodiments, the well sub-surface system (122) includes casing installed in the wellbore (120). For example, the wellbore (120) may have a cased portion and an uncased (or "open-hole") portion. The well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1A, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature, and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellbore (130), referred to as "wellhead temperature" ($T_{wh}$). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) ($Q_{wh}$) passing through the wellhead (130).

In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well system (106) to assess a relatively current state of the well system (106) and make real-time decisions regarding development of the well system (106) and the reservoir (102), such as on-demand adjustments in regulation of production flow from the well.

Figure 2:
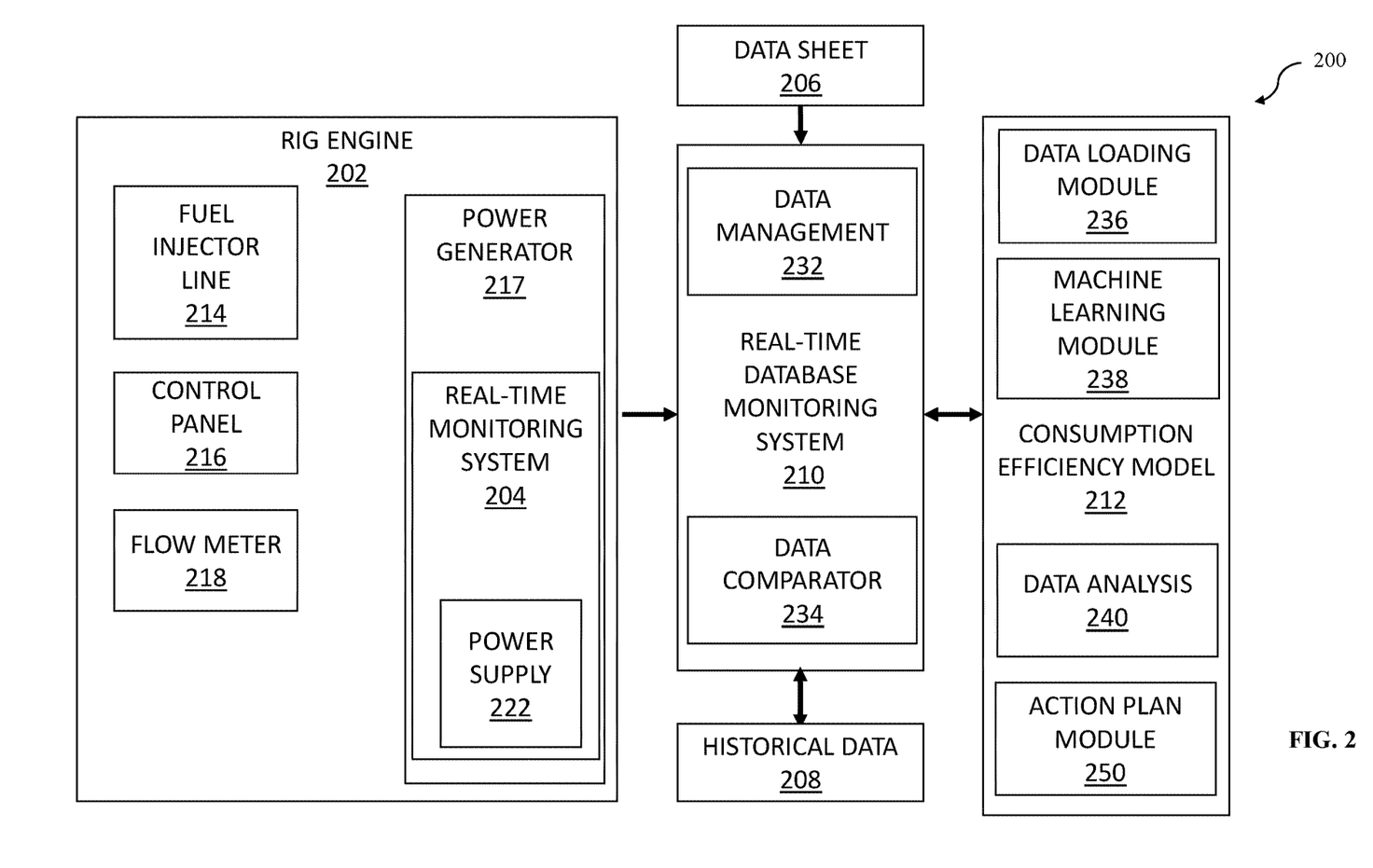
FIG. 2 shows a block diagram of a system in accordance with one or more embodiments.

In some embodiments, the well control system (126) through the logging system (112) collects and records wellhead data (140) for the well system (106). A real-time monitoring system (204), as depicted in FIG. 2, may generate datasets of dynamic data based on the collected wellhead data (140).

In some embodiments, the well system (106) is provided with a reservoir simulator (160). For example, a consumption efficiency model (212) depicted in FIG. 2 may be part of the reservoir simulator (160) that includes hardware and/or software with functionality for analyzing well log data and/or performing one or more reservoir simulations. For example, the reservoir simulator (160) may store well logs and data regarding core samples for performing simulations. The reservoir simulator (160) may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. the reservoir simulator (160) may include hardware or software with functionality for generating one or more trained models regarding the formation (104). For example, the reservoir simulator (160) may store well logs and data regarding core samples, and further analyze the well log data, the core sample data, seismic data, or other types of data to generate or update the one or more trained models having a complex geological environment. For example, different types of models may be trained, such as machine learning, artificial intelligence, convolutional neural networks, deep neural networks, support vector machines, decision trees, inductive learning models, deductive learning models, and supervised learning models, and are capable of approximating solutions of complex non-linear problems. The reservoir simulator (160) may couple to the logging system (112) and the drilling system (110).

In some embodiments, the reservoir simulator (160) may include functionality for applying machine learning and deep learning methodologies to precisely determine various subsurface layers. To do so, a large amount of interpreted data may be used to train a model. To obtain this amount of data, the reservoir simulator (160) may augment acquired data for various geological scenarios and drilling situations. For example, drilling logs may provide similar log signatures for a particular subsurface layer except where a well encounters abnormal cases. Such abnormal cases may include, for example, changes in subsurface geological compositions, well placement of artificial materials, or various subsurface mechanical factors that may affect logging tools. As such, the amount of well data with abnormal cases available to the reservoir simulator (160) may be insufficient for training a model. Therefore, in some embodiments, the reservoir simulator (160) may use data augmentation to generate a dataset that combines original acquired data with augmented data based on geological and drilling factors. This supplemented dataset may provide sufficient training data to train a model accordingly.

In some embodiments, the reservoir simulator (160) is implemented in a software platform for the well control system (126). The software platform may obtain data acquired by the drilling system (110) and logging system (112) as inputs, which may include multiple data types from multiple sources. The software platform may aggregate the data from these systems (110, 112) in real time for rapid analysis. Real-time of or relating to computer systems in the software platform is defined as the actual time for updating information with instantaneous processing at the same rate as required by a user or necessitated by a process being controlled. In some embodiments, the well control system (140), the logging system (112), or the reservoir simulator (160) may include a computer system that is similar to the computer system (400) described with regard to FIGS. 4A and 4B and the accompanying description.

Turning to FIG. 2, FIG. 2 illustrates a block diagram of a rig system (200) in accordance with one or more embodiments. More specifically, FIG. 2 shows the major components of the drill rig (150) of FIG. 1A that are used in rig operations. In particular, the system (200) includes a rig engine (202), a real-time monitoring system (204), a real-time database monitoring system (210) and a consumption efficiency model (212). Each of these components are discussed in detail below.

In some embodiments, the rig engine (202) provides power to the rig equipment on the drill rig (150). The rig engine may be a diesel engine and includes a fuel injector line (214), a control panel (216), a power generator (217), and a flow meter (218). The rig engine (202) is connected to the fuel injector line (214) to receive fuel, typically diesel fuel, used for running the power generator (217). In one or more embodiments, the flow meter (218) is hardware added to the rig engine (202) as a sensor used to monitor the power and fuel consumption of the power generator (217) of the rig engine (202). In addition, other sensors (not shown) may be used to measure pressure, temperature, load, and RPM of an exhaust fuel. The measurements taken by the flow meter and other sensors are converted to respective signals and are fed to the control panel (216) for further analysis. The rig equipment may include a diesel tank (152), as shown in FIG. 1B, to supply the diesel fuel to the rig engine (202). In one or more embodiments, a separate flow meter may be added to the diesel tank to monitor fuel consumption of the diesel tank feeding all of the rig engines on multiple rigs. The flow meter (218) of the rig engine and of the diesel tank may be a digital flow meter or a manual flow meter.

In one or more embodiments, a real-time monitoring system (204) may be installed on the power generator (217) of the rig engine (202) and enables monitoring of the power production and fuel consumption data in real-time. The real-time monitoring system (204) may also be known as a power logger. In some embodiments, the real-time monitoring system (204) includes a computer processor and a storage that may be the same as or similar to that of computer processor (402) and persistent storage (406) described below in FIG. 4A and the accompanying description. The real-time monitoring system (204) may include a power supply (222) which is a hardware component to supply power to all other components of the system. For example, the power supply (222) may convert a 110-115 or 220-230 volt AC (alternating current) into a steady low-voltage DC (direct current) usable by the computer processor (224).

In some embodiments, in addition to the real-time monitoring system (204) of the power generator (217), a real-time database monitoring system (210) is also employed to monitor operating parameters of the drill rig (150) equipment. In one or more embodiments, the real-time database monitoring system (210) may be, for example, commercially available application petro-link. The real-time database monitoring system (210) may run on any computing device such as that shown in FIG. 4A and may be remote to or part of the rig equipment on the drill rig (150) and may be associated with any suitable database or repository for storing data in any form. In one or more embodiments, the real-time database monitoring system (210) may take as input both an original equipment manufacturer (OEM) provided data sheet(s) (206) for various rig equipment operating parameters and historical data (208) of the rig equipment operating parameters. For example, OEM provided data sheets may include energy consumption curves typical of each piece of rig equipment. In one or more embodiments, the real-time calculation of the energy efficiency of rig equipment may be compared to the known energy curves provided by the OEM to determine deficiencies. Furthermore, the real-time database monitoring system (210) is configured to be fed the fuel consumption data through the flow meter (218).

The real-time database monitoring system (210) may include specific modules with particular functionalities, such as a data management (232) and a data comparator (234) in addition to the modules already mentioned above for the real-time monitoring system (204). The data management (232) module stores and manages data sets from the data sheet(s) (206) and the historical data (208) of the rig equipment, and data sets from operating parameters of the rig equipment obtained from the real-time monitoring system (204), such as the fuel consumption data fed to the real-time database monitoring system (210) from the flow meter (218). In one or more embodiments, both data sets are linked to establish optimum energy efficiency values computed using the consumption efficiency model (212), which are fed back to the real-time database monitoring system (210) and forms a basis of continuously updated historical data (208) of the rig equipment. Incorporating fuel consumption data in real-time database monitoring system with historical drilled footage from the same database allows for establishing a real-time diesel/ft metric. The data comparator (234) compares the optimum energy efficiency values to real-time values of the rig equipment and checks for any deviation between current optimum energy efficiency values and existing optimum energy efficiency values. In particular, the real-time database monitoring system (204) is able to identify similarities of the rig equipment and match data to strengthen training of the reservoir simulator (160) and allow for more optimization in detection.

The consumption efficiency model (212) is software capable of calculating the energy efficiency based on the data sets mentioned above. In one or more embodiments, the consumption efficiency model (212) is configured to apply statistics methods of correlating different rig energy data factors in order to optimize the rig equipment energy consumption. In some embodiments, the consumption efficiency model (212) may include specific modules with particular functionalities, such as a data loading module (236), a machine learning module (238), a data analysis (240), and an action plan module (250).

The data loading module (236) is responsible for reading one file or multiple files received at once (from a folder, zipped files, a server, streaming data, and the like) from the real-time monitoring system (204). If received files are in a compressed format, all compressed files are decompressed to ensure easier and more precise formatting. Further, the data loading module (236) is configured to format the received data into a singular format to maintain consistency throughout the real-time monitoring process. The received data may be formatted as a single compressed file that contains large quantities of log files or individual log files in at least one of DLIS, LAS, image, or main log formats. In one or embodiments, the consumption efficiency model (212) may be included in the reservoir simulator (160) and receives data from the logging system (112) described previously in FIG. 1A and the accompanying description.

Continuing with FIG. 2, the machine learning (ML) module (238) includes algorithms and equations used to perform advance analysis of datasets. For example, the ML module (238) may include a supervised ML algorithm, a Deep Learning (DL) algorithm, neural network models, physics-constrained machine learning (PCML) models, or any other suitable algorithms. Further, the ML module (238) is configured to compute optimum energy efficiency values using an embedded general energy efficiency equation for various drilling rig equipment. This energy efficiency equation is represented by the following equation:

$$\text{Efficiency (\%)} = 100 \times \frac{\text{Output Power } (Po)}{\text{Input Power } (Pi)}$$

Those skilled in the art will appreciate that the energy efficiency may be represented as a percentage or rate, or any other suitable value.

The computed optimum energy efficiency values are used to determine the energy efficiency of the rig equipment in real-time and compared to a target based on an average energy efficiency from the historical data of the rig equipment (208), performing under the same operational parameters in the data comparator (234) described previously. The data analysis (240) module analyzes the deviation observed between the current optimum energy efficiency values and the existing optimum energy efficiency values and generates a classification of the rig equipment. Based on the analysis, the data analysis (240) module ranks the rig equipment based on an energy efficiency rate and an energy failure rate to optimize a maintenance of the rig equipment and/or a replacement selection of the rig equipment.

The action plan module (250) generates a report of an action plan for processing the rankings of rig equipment. In one or more embodiments, the action plan module (250) includes functionality to generate action plans to identify potential rig equipment failures in real-time and investigate a deficient rig equipment based on the current optimum energy efficiency value. In addition, the current optimum energy efficiency value is established as a new optimum energy efficiency value when the current optimum energy efficiency value is higher than the existing optimum energy efficiency value. Further, the historical data (208) of the rig equipment is updated based on the current optimum energy efficiency value for comparing later to real-time values of the operational parameters of the rig equipment. Based on the nature of the failure in the rig equipment, the action plan module (250) either performs the maintenance of the rig equipment or selects the replacement of the rig equipment. The action plan module (250) may also have a feature that automatically flags inefficient drill rig equipment.

Figure 3:
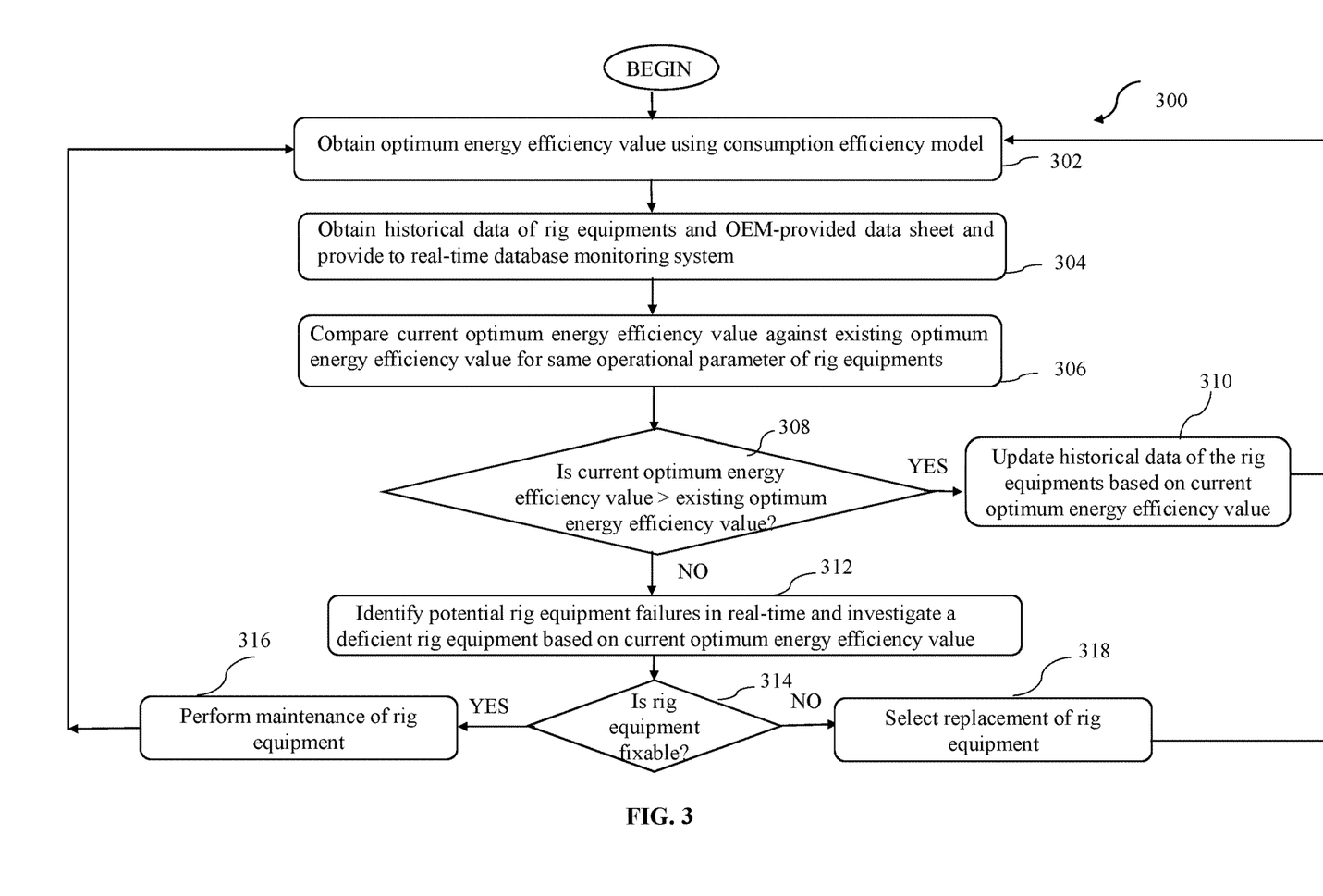
FIG. 3 shows a flowchart in accordance with one or more embodiments.

FIG. 3 shows a flowchart (300) in accordance with one or more embodiments. Specifically, FIG. 3 describes a general method for a monitoring system for the rig equipment. One or more steps in FIG. 3 may be performed by one or more components (for example, drill rig (150), logging system (112), flow rate sensor (139), reservoir simulator (160), real-time monitoring system (204), and real-time database monitoring system (210)) as described in FIGS. 1-2. While the various steps in FIG. 3 are presented and described sequentially, one of ordinary skill in the art will appreciate that some or all of the steps may be executed in different orders, may be combined, or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In step 302, the optimum energy efficiency value is obtained using the consumption efficiency model in accordance with one or more embodiments. In particular, power production and fuel consumption data of the rig equipment (for example, equipment that is part of drill rig (150)) are obtained through a digital flow-meter (218) described previously in FIG. 2. The power production and fuel consumption data are fed into a real-time monitoring system of the rig (for example, real-time monitoring system (204)) described previously in FIG. 2 and the accompanying description. The value obtained in step 302 is using the current operation of the drilling rig equipment, at the time step 302 is performed.

In some embodiments, a real-time performance of an energy efficiency of the rig equipment is determined by computing the optimum energy efficiency value using the consumption efficiency model (for example, consumption efficiency model (212)). The following example shows how an application of the equation of the consumption efficiency model may be used for examining the drawworks which has the primary function of reeling out and reeling in the drilling line, a large diameter wire rope, in a controlled fashion.

In one or more embodiments, parameters influencing energy consumption for the drawworks of the drill rig (150) in the real-time monitoring system (204) are hook load and block position. A relationship governing above-mentioned parameters and linking them to compute energy/power consumption is:

$$Hookload(\text{lbf}) \times \Delta \text{ block position (ft)} \times \text{constant} = \text{kWh} \qquad (1)$$

$$Hookload(\text{lbf}) \times \text{block speed} \left(\frac{\text{ft}}{\text{hr}}\right) \times \text{constant} = \text{kW} \qquad (2)$$

Equations (1) and (2) provide an expected kW for a given operation of the drawworks. The real-time monitoring system provides the actual kW used in the operation. An efficiency of the drawworks may be calculated based on the above-mentioned two kW values.

In some embodiments, difference between the real-time monitoring system (204) readings before and after turning on the drawworks represents the drawworks power consumption. Similarly, there are equations governing operational parameters and energy consumption for pumps and top drive systems of the drill rig (150). Those skilled in the art will appreciate that the above was an example of one set of equations for the drawworks energy efficiency calculations and that the necessary equations for calculating the energy efficiency of any rig equipment are stored, for example, in the consumption efficiency model (212) or in the database of the real-time database monitoring system (210).

In step 304, the historical data of rig equipment and OEM provided data sheet(s) are input into the real-time database monitoring system in accordance with one or more embodiments. For example, the data sheet (206) and historical data (208) of the rig equipment are obtained and fed to the real-time database monitoring application (210) of the drill rig (150) system to identify the deficient equipment by comparing against the real-time performance of energy efficiency of the rig equipment described previously in FIG. 2 and the accompanying description.

In step 306, the current optimum energy efficiency value is compared against the existing optimum energy efficiency value for same operational parameters of rig equipment in accordance with one or more embodiments. In particular, the computed optimum energy efficiency values are used to determine the energy efficiency of the rig equipment in real-time and compared to a target based on an average energy efficiency from the historical data of the rig equipment (208) performing under the same operational parameters described previously in FIG. 2 and the accompanying description.

In step 308, a determination is made as to whether the current optimum energy efficiency value is has a value higher than the existing optimum energy efficiency value in accordance with one or more embodiments. In step 310, if the current optimum energy efficiency value is higher than the existing optimum energy efficiency value, the historical data of the rig equipment (208) are updated based on the current optimum energy efficiency value in accordance with one or more embodiments. In addition, the current optimum energy efficiency value is established as a new optimum energy efficiency value described previously in FIG. 2 and the accompanying description.

In step 312, if the current optimum energy efficiency value is lower than the existing optimum energy efficiency value, potential rig equipment failures are identified in real-time in accordance with one or more embodiments. In addition, a deficient rig equipment is investigated based on the current optimum energy efficiency value and by observing higher power consumption for the rig equipment than the expected consumption based on the historical data or data sheet described previously in FIG. 2 and the accompanying description.

In step 314, the rig equipment is checked and it is determined whether the deficient rig equipment is fixable or not in accordance with one or more embodiments. In particular, the rig equipment are ranked based on an energy efficiency rate and an energy failure rate to optimize a maintenance of the rig equipment (step 316) and if the rig equipment is not ranked in manner that allows the rig equipment to be salvaged, a replacement selection of the rig equipment is made in step 318. In some embodiments, the real-time monitoring system data may continuously feed and update the historical data for various rig equipment and enable the real-time monitoring system to identify in real-time potential rig equipment failures.

Thus, those skilled in the art will appreciate that the flow chart of FIG. 3 is constantly executing to determine the most energy efficient values for various rig equipment while drilling operations are being performed, in real-time. Further, not only is the process of FIG. 3 continuous, the process shown may be repeated for each unique piece of rig equipment having different energy consumption parameters and equations in the energy consumption model. In this manner, the model (212) does not conform to a unifying model for all rig equipment in general, or conform to a one-size-fits-all type of model, but can remain an independent analysis for each unique piece of rig equipment with optimum failure rate detection for each individual piece of equipment.

In one or more embodiments, following example shows how each rig equipment compares by itself from its historical performance in addition of creating a baseline for each rig equipment as it gets implemented and gets trained in real-time instead of having previous data to train the monitoring system. This allows monitoring the whole fleet without unifying the consumption efficiency model and allows to keep each rig equipment uniqueness with the ability of failure detection.

Following example shows how various steps of the flowchart (300) are implemented based on applying the following actual data to mud pumps in the drill rig (150) in accordance with one or more embodiments:
Pump pressure: 1660 psi
Flow rate: 600 gpm
Power consumption: 530 kW In some embodiments, if these operating parameters are fed into the historical data, that power consumption may initially be considered as the optimum power for the following operational parameters:

Scenario A

Pump pressure:1660 psi
Flow rate: 600 gpm
Power consumption: 500 KW

On comparing the data shown above to the existing optimum energy efficiency value of the rig equipment may lead the real-time monitoring system to register the above obtained value as the new optimum for these operational parameters of the rig equipment.

Scenario B

Pump pressure:1660 psi
Flow rate: 600 gpm
Power consumption: 600 KW

In some embodiments, on comparing the data shown above to the existing optimum energy efficiency value of the rig equipment may lead the real-time monitoring system to flag as deficient.

In one or more embodiments, the real-time monitoring system may identify similarity of the rig equipment and match their data to strengthen training of the consumption efficiency model (212) and allow for more optimization in detection. In addition, the real-time monitoring system may rank the rig equipment based on an energy efficiency and an energy failure rate to optimize the rig equipment maintenance and the rig equipment replacement selection.

One or more embodiments disclosed herein provides real-time monitoring of power performance and fuel consumption, real-time identification of potential rig equipment failures, and facilitates the conducting of thorough fuel consumption analysis. In other words, the embodiments of the disclosure apply the concept of the real-time monitoring system which allows monitoring the deficiencies of the rig equipment by detecting deviation from the expected energy consumption. Embodiments disclosed herein introduce a way to compare each type of rig equipment by itself from its historical performance, in addition to creating a baseline for each equipment as it gets implemented and gets trained on the go instead of having previous data to train the system. This allows monitoring of the whole fleet of rig equipment without unifying the equipment model and conditions, maintaining the uniqueness of each equipment with the ability of failure detection. Further, the system is able to identify similarity of the equipment and match data to strengthen its training and allow for more optimization in detection. In addition, the system ranks the rig equipment based on efficiency and failure rate to optimize equipment maintenance and equipment replacement selection.

Figure 4A:
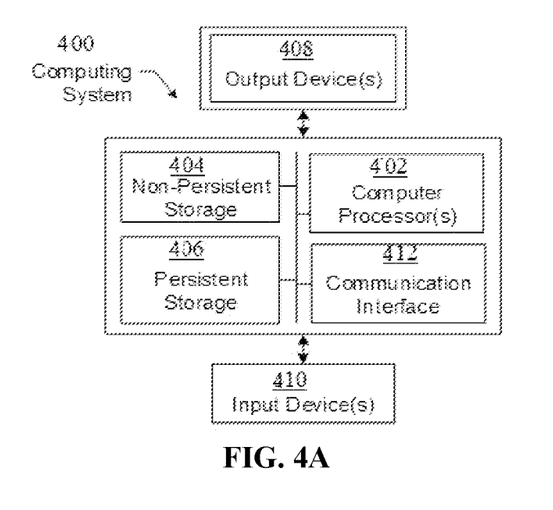
FIGS. 4A and 4B show a computing system in accordance with one or more embodiments.

Embodiments may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 4B:
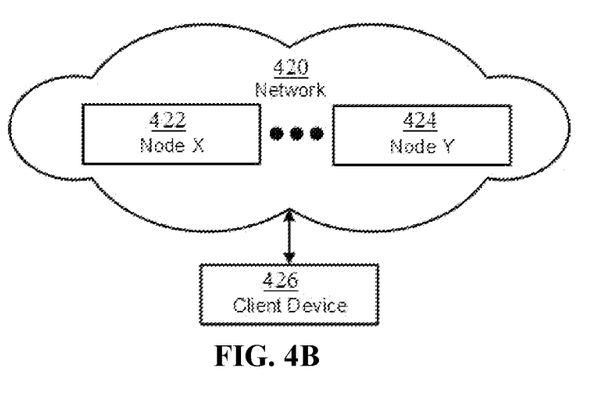

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (for example, node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:
1. A method, comprising:
obtaining power production and fuel consumption data of a first piece of rig equipment, wherein the first piece of rig equipment is operated according to a first set of operational parameters;
feeding the power production and fuel consumption data of the first piece of rig equipment into a real-time monitoring system;
determining an energy efficiency, based on real-time performance, of the first piece of rig equipment using a consumption efficiency model and the power production and fuel consumption data;
determining an optimum energy efficiency value using the consumption efficiency model;
determining a target energy efficiency based on an average energy efficiency at the first set of operational parameters using historical data of the first piece of equipment;
comparing the energy efficiency of the first piece of rig equipment against the target energy efficiency by a real-time database monitoring system;
determining an existing optimum energy efficiency value based on the historical data;
establishing a new optimum energy efficiency value if the optimum energy efficiency value is higher than the existing optimum energy efficiency value;

updating the existing optimum energy efficiency value with the new optimum energy efficiency value for comparing later to real-time values of the first piece of the rig equipment;

updating the historical data of the first piece of rig equipment with the energy efficiency;

identifying deficiencies of the first piece of rig equipment in real-time and determining maintenance or replacement of the first piece of rig equipment based on the comparison of the energy efficiency to the target energy efficiency; and performing maintenance on or replacement of the first piece of rig equipment upon identifying a deficiency.

2. The method of claim 1, further comprising: ranking the first piece of rig equipment based on an energy efficiency rate and an energy failure rate to optimize the maintenance of the first piece of the rig equipment or the replacement selection of the first piece of the rig equipment.

3. The method of claim 1, wherein the deficiencies are identified in real-time by observing higher power consumption for the first piece of rig equipment than an expected consumption based on the historical data of the first piece of rig equipment or based on an OEM provided data sheet for the first piece of rig equipment.

4. The method of claim 1, wherein the first set of operational parameters comprises one or more of the following:
   a pump pressure;
   a flow rate;
   a power consumption; and
   a fuel consumption.

5. The method of claim 1, further comprising:
   obtaining power production and fuel consumption data of a second piece of rig equipment, wherein the second piece of rig equipment is part of a drilling rig and is different than the first piece of rig equipment, and wherein the second piece of rig equipment is operated according to a second set of operational parameters;
   feeding the power production and fuel consumption data of the second piece of rig equipment into a real-time monitoring system;
   determining an energy efficiency, based on real-time performance, of the second piece of rig equipment using the consumption efficiency model, wherein the consumption efficiency model comprising unique algorithms and equations for each of the first piece of rig equipment and second piece of rig equipment;
   determining a target energy efficiency value based on an average energy efficiency at the second set of operational parameters using historical data of the second piece of rig equipment;
   comparing the energy efficiency of the second piece of rig equipment against the target energy efficiency value of the second piece of rig equipment by a real-time database monitoring system;
   updating the historical data of the second piece of rig equipment with the energy efficiency;
   identifying deficiencies of the second piece of rig equipment in real-time and determining maintenance or replacement of the second piece of rig equipment based on the comparison of the energy efficiency to the target energy efficiency of the second piece of rig equipment; and
   performing maintenance on or replacement of the second piece of rig equipment upon identifying a deficiency.

6. The method of claim 5, further comprising:
   ranking the second piece of rig equipment against the first piece of rig equipment based on an energy efficiency rate and an energy failure rate to optimize the maintenance of the second piece of the rig equipment or the replacement selection of the second piece of the rig equipment.

7. A drilling rig, comprising:
   a rig engine comprising a generator configured to provide power to a plurality of rig equipment of the drilling rig, the generator comprising a monitoring system for monitoring real-time operation of a first piece of rig equipment of the plurality of rig equipment of the drilling rig, wherein the first piece of rig equipment is operated according to a first set of operational parameters;
   a flow meter operatively connected to the generator through which power production and fuel consumption data are fed to a real-time database monitoring system; and
   a computing device operatively connected to the real-time database monitoring system and comprising a consumption efficiency model, the computing device having a processor configured to execute a method for determining an energy efficiency of the first piece of rig equipment, comprising:
      feed the power production and fuel consumption data of the first piece of rig equipment from the flow meter into the real-time monitoring system of the drilling rig;
      determine an energy efficiency, based on real-time performance, of the first piece of rig equipment using the consumption efficiency model and the power production and fuel consumption data;
      determine an optimum energy efficiency value using the consumption efficiency model;
      determine a target energy efficiency value based on an average energy efficiency using historical data of the first piece of rig equipment;
      compare the energy efficiency of the first piece of rig equipment against the target energy efficiency value by a real-time database monitoring system;
      determine an existing optimum energy efficiency value based on the historical data;
      establish a new optimum energy efficiency value if the optimum energy efficiency value is higher than the existing optimum energy efficiency value;
      update the existing optimum energy efficiency value with the new optimum energy efficiency value for comparing later to real-time values of the first piece of the rig equipment;
      update the historical data of the first piece of rig equipment with the energy efficiency; and
      identify deficiencies of the first piece of rig equipment in real-time and determining maintenance or replacement of the first piece of rig equipment based on the comparison of the energy efficiency to the target energy efficiency,
   wherein, upon identifying a deficiency, maintenance or replacement is performed on the first piece of rig equipment.

8. The drilling rig of claim 7, wherein the processor is further configured to:
   rank the first piece of rig equipment based on an energy efficiency rate and an energy failure rate to optimize the maintenance of the first piece of the rig equipment or the replacement selection of the first piece of the rig equipment.

9. The drilling rig of claim 7, wherein the deficiencies are identified in real-time by observing higher power consumption for the first piece of rig equipment than an expected consumption based on the historical data of the first piece of rig equipment or an OEM data sheet of the first piece of rig equipment.

10. The drilling rig of claim 7,
wherein the first set of operational parameters comprises one or more of the following:
a pump pressure;
a flow rate;
a power consumption; and
a fuel consumption.

11. The drilling rig of claim 7, wherein the processor is further configured to:
obtain power production and fuel consumption data of a second piece of rig equipment, wherein the second piece of rig equipment is part of the drilling rig and is different than the first piece of rig equipment;
feed the power production and fuel consumption data of the second piece of rig equipment into a real-time monitoring system;
determine an energy efficiency, based on real-time performance, of the second piece of rig equipment using the consumption efficiency model, wherein the consumption efficiency model comprising unique algorithms and equations for each of the first piece of rig equipment and second piece of rig equipment;
determine a target energy efficiency value based on an average energy efficiency at the second set of operational parameters using historical data of the second piece of rig equipment;
compare the energy efficiency of the second piece of rig equipment against the target energy efficiency value of the second piece of rig equipment by a real-time database monitoring system;
update the historical data of the second piece of rig equipment with the energy efficiency;
identify deficiencies of the second piece of rig equipment in real-time and determine maintenance or replacement of the second piece of rig equipment based on the comparison of the energy efficiency to the target energy efficiency of the second piece of rig equipment.

12. The drilling rig of claim 11, wherein the processor is further configured to: rank the second piece of rig equipment against the first piece of rig equipment based on an energy efficiency rate and an energy failure rate to optimize the maintenance of the second piece of the rig equipment or the replacement selection of the second piece of the rig equipment.

13. A non-transitory computer readable medium storing instructions executable by a computer processor, the instructions comprising functionality for:

obtaining power production and fuel consumption data of a first piece of rig equipment, wherein the first piece of rig equipment is operated according to a first set of operational parameters;
feeding the power production and fuel consumption data of the first piece of rig equipment into a real-time monitoring system;
determining an energy efficiency, based on real-time performance, of the first piece of rig equipment using a consumption efficiency model and the power production and fuel consumption data;
determining an optimum energy efficiency value using the consumption efficiency model;
determining a target energy efficiency based on an average energy efficiency at the first set of operational parameters using historical data of the first piece of equipment;
comparing the energy efficiency of the first piece of rig equipment against the target energy efficiency by a real-time database monitoring system;
determining an existing optimum energy efficiency value based on the historical data;
establishing a new optimum energy efficiency value if the optimum energy efficiency value is higher than the existing optimum energy efficiency value;
updating the existing optimum energy efficiency value with the new optimum energy efficiency value for comparing later to real-time values of the first piece of the rig equipment;
updating the historical data of the first piece of rig equipment with the energy efficiency; and
identifying deficiencies of the first piece of rig equipment in real-time and determining maintenance or replacement of the first piece of rig equipment based on the comparison of the energy efficiency to the target energy efficiency,
wherein, upon identifying a deficiency, maintenance or replacement is performed on the first piece of rig equipment.

14. The method of claim 1, wherein a power consumption of the first piece of rig equipment is measured by the real-time monitoring system by determining the difference in measured power consumption before and after turning on the first piece of rig equipment.

15. The drilling rig of claim 7, wherein a power consumption of the first piece of rig equipment is measured by the real-time monitoring system by determining the difference in measured power consumption before and after turning on the first piece of rig equipment.

16. The non-transitory computer readable medium of claim 13, further configured to measure a power consumption of the first piece of rig equipment by the real-time monitoring system by determining the difference in measured power consumption before and after turning on the first piece of rig equipment.

* * * * *